United States Patent
Guo

(10) Patent No.: US 7,009,137 B2
(45) Date of Patent: Mar. 7, 2006

(54) LASER POWDER FUSION REPAIR OF Z-NOTCHES WITH NICKEL BASED SUPERALLOY POWDER

(75) Inventor: Wen Guo, Greer, SC (US)

(73) Assignee: Honeywell International, Inc., Morristown, NJ (US)

( * ) Notice: Subject to any disclaimer, the term of this patent is extended or adjusted under 35 U.S.C. 154(b) by 60 days.

(21) Appl. No.: 10/402,111

(22) Filed: Mar. 27, 2003

(65) Prior Publication Data
US 2004/0191064 A1   Sep. 30, 2004

(51) Int. Cl.
B23K 26/34   (2006.01)

(52) U.S. Cl. .................................. 219/121.64
(58) Field of Classification Search ........... 219/121.63, 219/121.64; 148/512, 525, 565
See application file for complete search history.

(56) References Cited

U.S. PATENT DOCUMENTS

| | | | |
|---|---|---|---|
| 4,155,152 A | | 5/1979 | Cretella et al. |
| 4,285,459 A | | 8/1981 | Baladjanian et al. |
| 4,291,448 A | | 9/1981 | Cretella et al. |
| 4,293,338 A | | 10/1981 | Rose et al. |
| 4,804,815 A | * | 2/1989 | Everett .................. 219/121.66 |
| 4,822,248 A | | 4/1989 | Wertz et al. |
| 4,878,953 A | | 11/1989 | Saltzman et al. |
| 4,998,005 A | * | 3/1991 | Rathi et al. ............. 219/121.83 |
| 5,071,054 A | | 12/1991 | Dzugan et al. |
| 5,160,822 A | | 11/1992 | Aleshin |
| 5,211,540 A | | 5/1993 | Evans |
| 5,554,837 A | | 9/1996 | Goodwater et al. |
| 5,606,796 A | | 3/1997 | Fraser |
| 5,622,638 A | * | 4/1997 | Schell et al. ........... 219/121.64 |
| 5,806,751 A | | 9/1998 | Schaefer et al. |
| 5,889,254 A | * | 3/1999 | Jones ..................... 219/121.63 |
| 5,914,059 A | * | 6/1999 | Marcin et al. ......... 219/121.66 |
| 6,054,672 A | | 4/2000 | Foster et al. |
| 6,103,402 A | | 8/2000 | Marcin, Jr. et al. |
| 6,154,959 A | | 12/2000 | Goodwater et al. |
| 6,164,916 A | | 12/2000 | Frost et al. |
| 6,173,491 B1 | | 1/2001 | Goodwater et al. |
| 6,233,822 B1 | | 5/2001 | Grossklaus, Jr. et al. |
| 6,269,540 B1 | | 8/2001 | Islam et al. |
| 6,283,356 B1 | | 9/2001 | Messelling |
| 6,302,649 B1 | | 10/2001 | Mukira et al. |
| 6,326,585 B1 | | 12/2001 | Aleshin et al. |

(Continued)

FOREIGN PATENT DOCUMENTS

EP   1 249 300 A1   10/2002

(Continued)

OTHER PUBLICATIONS

PCT International Search Report PCT/US2004/009901, Apr. 19, 2005.

Primary Examiner—Geoffrey S. Evans
(74) Attorney, Agent, or Firm—Ingrassia Fisher & Lorenz

(57) ABSTRACT

A method is provided for repairing Z-notch wear surfaces on low pressure gas turbine engine turbine blades. The method is directed to turbine blades made of superalloy Inconel 713. Powdered Inconel 713 is welded to the Z-notch wear surface by directing an Nd:YAG laser beam upon the material. The laser beam is focused and traverses the wear surface in a stich-like pattern. The method allows Inconel 713 turbine blades to be repaired with the same material in a manner that does not generate cracking in the matrix material.

26 Claims, 5 Drawing Sheets

U.S. PATENT DOCUMENTS

| | | |
|---|---|---|
| 6,329,630 B1 | 12/2001 | Sato et al. |
| 6,332,272 B1 | 12/2001 | Sinnott et al. |
| 6,333,484 B1 * | 12/2001 | Foster et al. ............ 219/121.64 |
| 6,354,799 B1 | 3/2002 | Mukira et al. |
| 6,364,971 B1 * | 4/2002 | Peterson et al. ............ 148/525 |
| 6,402,507 B1 * | 6/2002 | Boettger ..................... 432/236 |
| 2004/0086635 A1 * | 5/2004 | Grossklaus et al. ......... 427/140 |
| 2004/0133298 A1 * | 7/2004 | Toyserkani et al. ......... 700/166 |

FOREIGN PATENT DOCUMENTS

| | | |
|---|---|---|
| WO | WO-03/042895 A1 * | 5/2003 |

* cited by examiner

LASER POWDER FUSION REPAIR OF Z-NOTCHES WITH NICKEL BASED SUPERALLOY POWDER

FIELD OF THE INVENTION

The present invention relates to fusion repair of gas turbine or jet engine turbine blades and, more particularly, to the use of YAG lasers to deposit Inconel 713 powder on a Z-notch wear surface of low pressure turbine blades.

BACKGROUND OF THE INVENTION

In an attempt to increase the efficiencies and performance of contemporary jet or gas turbine engines such as those used in industrial, marine or vehicle applications, engineers have progressively pushed the engine environment to more extreme operating conditions. The harsh operating conditions of high temperature and pressure that are now frequently specified place increased demands on engine components and materials. Indeed the gradual change in engine design has come about in part due to the increased strength and durability of new materials that can withstand the operating conditions present in the modern aerojet or turbine engine. With these changes in engine materials, there has arisen a corresponding need to develop new repair methods appropriate for such materials.

The turbine blade is one engine component that directly experiences severe engine conditions. Turbine blades are thus designed and manufactured to perform under repeated cycles of high stress and high temperature. An economic consequence of such a design criteria is that turbine blades can be quite expensive. It is thus highly desirable to maintain turbine blades in service for as long as possible, and to return worn turbine blades to service, if possible, through acceptable repair procedures.

Turbine blades used in modern jet or gas turbine engines are frequently castings from a class of materials known as superalloys. The superalloys can include alloys with high levels of nickel and/or cobalt. In the cast form, turbine blades made from superalloys include many desirable physical properties such as high strength. Advantageously, the strength displayed by this material remains present even under stressful conditions, such as high temperature and high pressure, experienced during engine operation.

Inconel 713 is one such superalloy. It is a preferred material for the construction of turbine blades. Inconel 713 is a precipitation hardenable alloy. Nickel, alloyed with materials such as aluminum and titanium, develops high strength characteristics that are sustainable at high temperatures, the temperature range that engine designers now seek. The strength arises in part through the presence of a gamma prime ($\gamma'$) phase of material. One characteristic of Inconel 713 is the high degree of gamma prime in cast materials.

Disadvantageously, the superalloys generally, and Inconel 713 in particular, are very difficult to weld successfully with known welding techniques. Various methods have been developed and are described in the technical literature related to resurfacing, restoring, repairing, and reconditioning worn turbine blades and Z-notch faces. However each of these methods has shortcomings or limitations that significantly limits the usefulness of the method.

Turbine blades used in contemporary jet engines often include a shroud with Z-notches for low pressure application. The term Z-notch refers to a configuration of the turbine blade shroud in the shape of a "Z". Neighboring blades interlock at the Z-notch areas. The Z-notch interlock provides turbine blades an additional degree of stiffness to offset the twisting forces that the blades experience. Z-notches also counterbalance harmful vibrational movements in the turbine blades. The Z-notches are points of contact between turbine blades, and the interlocking faces of Z-notches thus can experience wear and erosion. Consequently, over a period of time in operation the Z-notch wear surfaces of turbine blades may need to be repaired or resurfaced.

Traditional repair methods have proven unsatisfactory for the Inconel 713 material. For example, some known welding techniques heat the workpiece, the Z-notch area of a turbine blade, to high temperatures, temperatures sufficient to weld the alloy. However, at such a temperature, the turbine blade may experience heat cracking and fracturing, rendering the blade unusable for further engine service. Hence, it is desirable to find a repair method suitable for Inconel 713 that does not subject the workpiece matrix to heat-induced damage.

Other repair techniques include cladding of a matrix material with a hardsurfacing material or other materials with good weldability. Such a method is disadvantageous with respect to turbine blades manufactured of Inconel 713. In particular, a multi-material blade cannot be returned to service with other turbine blades that are single material blades because the mismatch in mechanical properties between adjacent blades may speed up material loss for blades with lesser properties. Further, the heating requirement to fuse a cladding material to Inconel 713 can subject the substrate material to excessive heating as in known welding techniques. Accordingly there is also a need for a repair method in which the repair material itself is the same as the substrate material, such as where the blade is made of Inconel 713 and the repair material is the same.

The option of throwing out worn turbine blades and replacing them with new ones is not an attractive alternative because the blades are expensive. A low pressure turbine blade made of Inconel 713 can be costly to replace, and a single stage in an engine may contain several dozen such blades. Moreover, a typical gas turbine engine can have multiple rows or stages of turbine blades. Consequently there is a strong financial benefit for acceptable repair methods for Inconel 713 turbine blades.

Hence, there is a need for a turbine repair method that addresses one or more of the above-noted drawbacks. Namely, a repair method is needed that does not result in significant component damage, and/or does not require the use of materials other than Inconel 713 or any other blade material, and/or requires minimal consumption of superalloy in the repair process, and by virtue of the foregoing is therefore less costly as compared to the alternative of replacing worn parts with new ones. The present invention addresses one or more of these needs.

SUMMARY OF THE INVENTION

The present invention provides a method for repairing turbine blade Z-notches with Inconel 713 powder. The method uses a YAG laser to create a highly localized area of heating that does not create weld-induced damage or cracking to the turbine. The method allows repaired turbine blades to return to service (with other single component blades) and therefore offers considerable cost savings over the replacement alternative.

In one embodiment, and by way of example only, a method is provided for repairing a worn surface of a turbine blade. The method comprises the steps of moving a YAG generated laser beam over a turbine blade wear surface; providing an alloy powder, such as Inconel 713, to the turbine blade wear surface, and generating sufficient power to the laser to affect a fusion bond between the alloy powder and the turbine blade surface.

In another exemplary embodiment, there is provided a method for repairing a worn Z-notch wear surface on a gas turbine or aerojet turbine blade that is made of Inconel 713. The method includes the steps of digitizing a weld path over the wear path with a video monitor of a CNC controller. A laser beam is generated with a Neodymium:yttrium-aluminum-garnet laser. Inconel 713 powder is discharged onto the wear surface through a discharge nozzle having an axial alignment different from the axial alignment of the laser. The alloy discharge nozzle and the laser move across the wear surface of the Z-notch thereby bonding a fusion layer of Inconel 713 powder to the substrate material of the Z-notch wear surface. The movement of the laser and the alloy discharge nozzle are controlled through a CNC controller using digitized weld path information. The depth of the cladding layer may be measured, and if desired steps may be repeated to add additional cladding layers to the Z-notch wear surface. In this way a cladding layer of desired depth may be achieved.

In yet another exemplary embodiment a method is shown for repairing a wear surface of a low pressure turbine engine blade composed of Inconel 713. The method comprises moving a YAG laser and an Inconel 713 powder discharge nozzle across a wear surface thereby repairing a first area, and then allowing the first area to cool. The YAG laser and Inconel powder discharge nozzle are then moved across a second wear surface area, proximate to the first area, and thereby repairing the second wear surface area. The second area is allowed to cool. The steps of repairing and cooling are repeated for additional areas until a total desired area has been repaired.

In still another exemplary embodiment, there is described a repaired gas turbine engine turbine blade. The repaired turbine blade includes an airfoil having a concave face and a convex face; a base assembly attached to the airfoil; and a shroud assembly attached to the airfoil. The shroud assembly of the repaired turbine blade has a repaired region and a non-repaired region. Further, the repaired area may be on the Z-notch wear surface of the shroud assembly. In a further embodiment, the non-repaired area such as the original matrix of the blade is Inconel 713, which is the same material used to create the repaired region.

Other independent features and advantages of the laser fusion assembly and method will become apparent from the following detailed description, taken in conjunction with the accompanying drawings which illustrate, by way of example, the principles of the invention.

DETAILED DESCRIPTION OF A PREFERRED EMBODIMENT

Reference will now be made in detail to exemplary embodiments of the invention, examples of which are illustrated in the accompanying drawings. Wherever possible, the same reference numbers will be used throughout the drawings to refer to the same or like parts.

Figure 1:
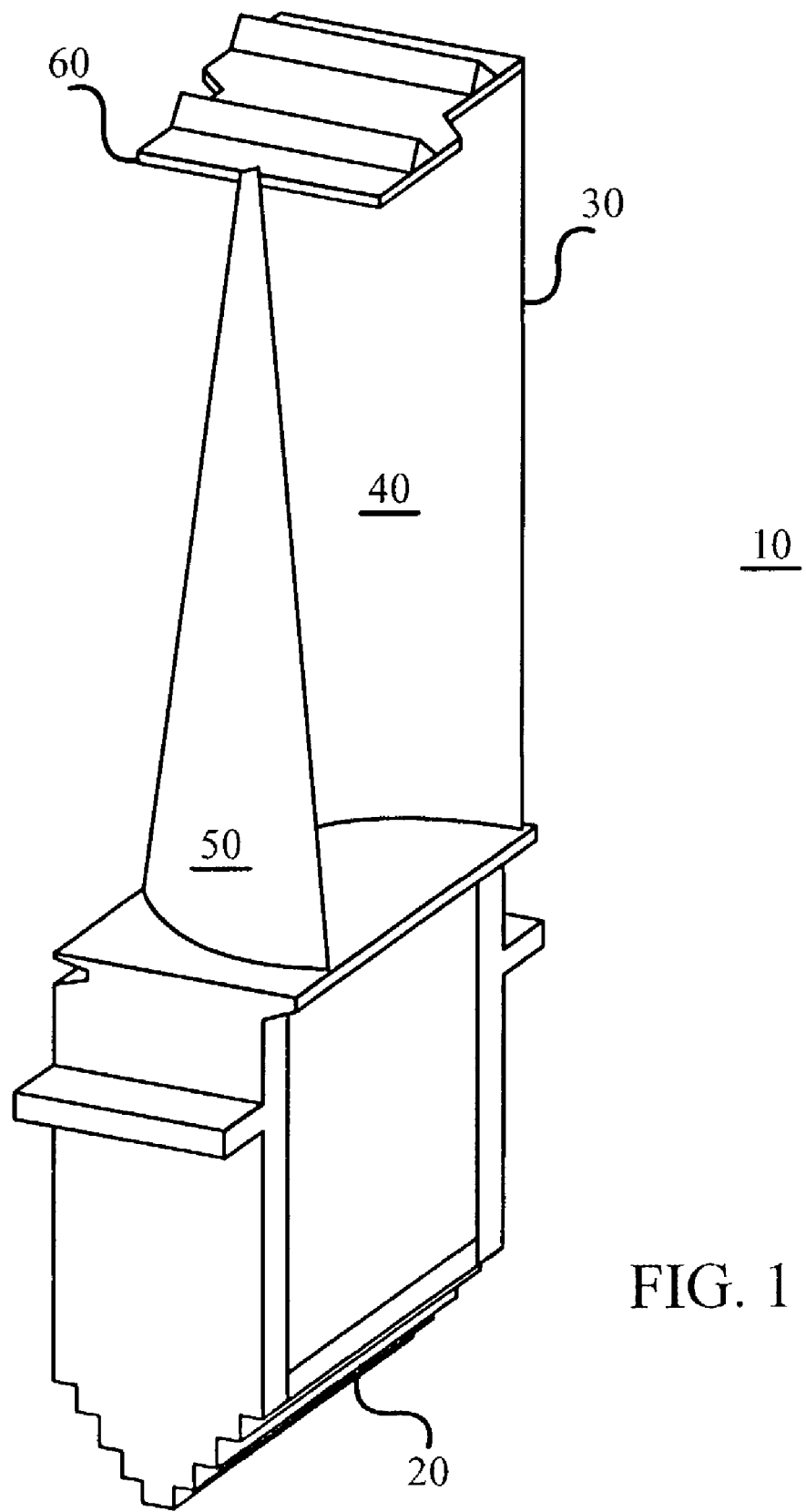
FIG. 1. is a perspective view of a turbine blade processed in accordance with an embodiment of the invention.

A typical gas turbine engine turbine blade 10 is illustrated in FIG. 1. Such a blade is typically several inches in length although sizes vary. A turbine blade includes a serrated base assembly 20, also called a mounting dovetail, tang, or christmas tree, where the blade is affixed to a hub (not shown). In a jet or gas turbine engine assembly, multiple such turbine blades are positioned in adjacent circumferential position along a hub or rotor disk. Airfoil 30, a cuplike structure, includes a concave face 40 and a convex face 50. In the literature of turbine technology airfoil 30 may also be referred to as a bucket. Airfoil 30 extends radially outwardly from the hub.

In operation, gases impinge on concave face 40 of airfoil 30 thereby providing the driving force for the turbine engine. Many turbine blades also have a shroud structure 60 at the upper (outer radial) end of turbine blade 10.

Figure 2:
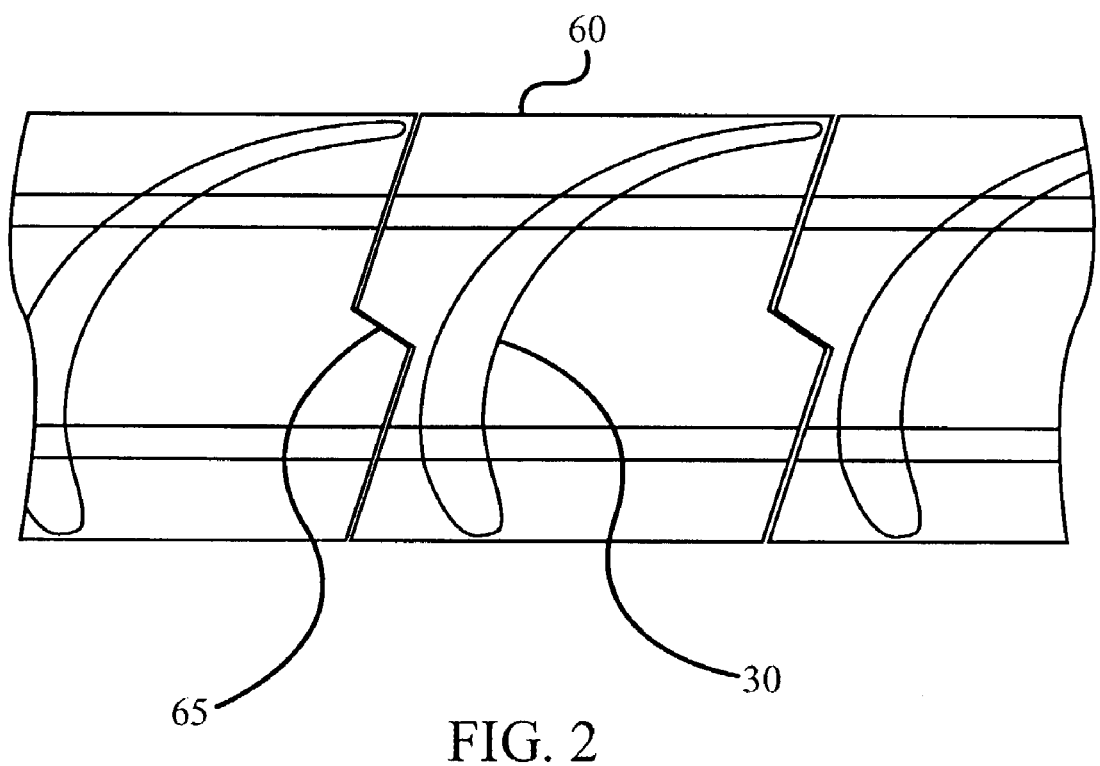
FIG. 2 is a top view showing the Z-notch interlocking interface on neighboring turbine blades. The bucket portion of the blade where it attaches to the Z-notch shroud is shown in dashed outline.

FIG. 2 shows a top view of a typical shroud structure. Turbine shroud 60 is formed so that shrouds on neighboring turbine blades interlock. Shown in dashed outline on FIG. 2 is airfoil 30 that underlines shroud 60. The shrouds used in contemporary turbine engines can include Z-notch 65. The Z-notch refers to a configuration of the shroud. Neighboring blades interlock at the Z-notch areas. The Z-notch interlock provides turbine blades an additional degree of stiffness to offset the twisting forces that the blades experience. Z-notches can also counterbalance harmful vibrational movements in the turbine blades and ensure that blades are properly aligned. The interlocking shroud structure is additionally useful as a means to prevent gases from avoiding the turbine blades. The Z-notches are points of contact between turbine blades, and the interlocking faces of Z-notches may thus experience wear and erosion. Consequently, over a period of time in operation, turbine blades may need to be repaired or resurfaced. The Z-notch area of contact is a typical area that needs such reworking; and notch faces thus form a workpiece for the laser powder fusion repair of the present invention.

Figure 3:
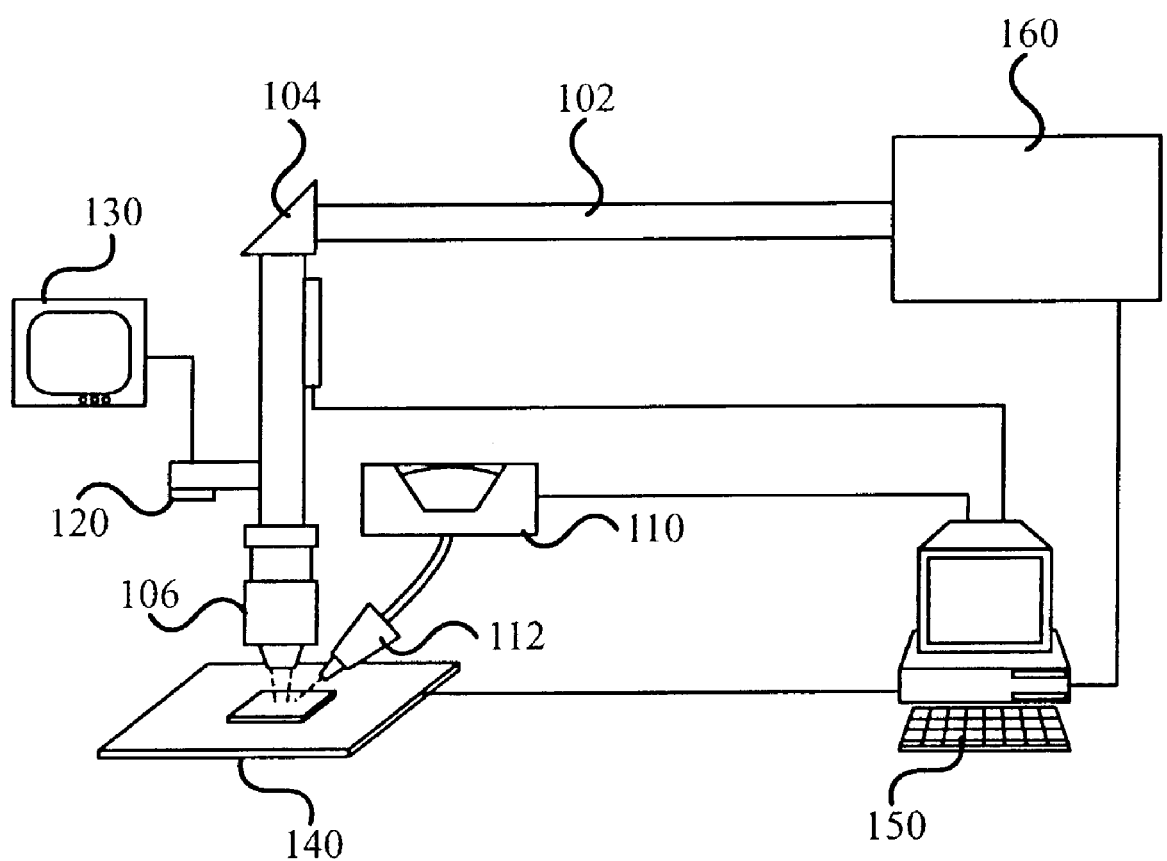
FIG. 3 is a schematic representation of the equipment and apparatus used to perform laser welding repair according to an embodiment of the present invention.

Referring now to FIG. 3 there is shown a preferred apparatus used in the laser welding system. YAG laser 100 generates the laser used in the welding system. A laser is directed through beam guide 102, through mirror 104, and through focus lens 106. The laser then impinges on the work piece. Components such as beam guide 102, mirror 104, and tows lens 106 are items known in the art of laser welding. Beamguide 102 may include fiber optic materials.

Powder of Inconel 713 is provided in powder feeder 110. The powder is fed onto the workpiece through powder feed nozzle 112.

Other components of the system include video camera 120 and video monitor 130. The workpiece is held on a work table 140.

Controller 150 may be a computer numerically controlled (CNC) positioning system. CNC controller 150 coordinates components of the system. As is known in the art the controller may also include a digital imaging system. The controller guides movement of the laser and powder feed across the face of the workpiece. In a preferred embodiment, movement of the workpiece in the XY plane is achieved through movement of the worktable. Movement in the up and down, or Z-direction is achieved by control of the laser arm; i.e., pulling it up or lowering it. Alternative methods of control are possible, such as controlled movement of the workpiece in all three directions, X, Y, and Z.

Figure 4:
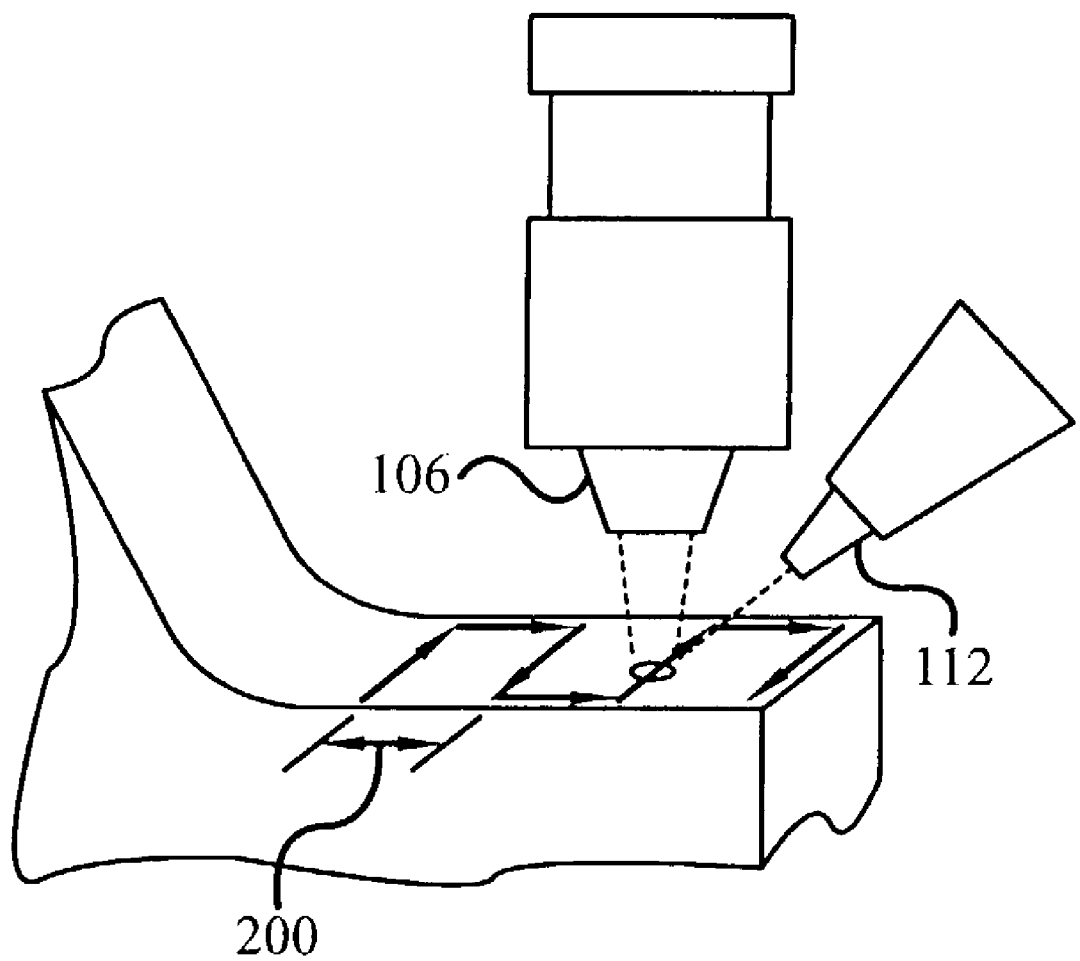
FIG. 4 is a close up perspective view of a path followed by the laser welding apparatus of FIG. 3 in applying a layer of Inconel 713 powder on a turbine blade Z-notch wear surface.

Under CNC control, the laser is guided across a face of the workpiece in a selected pattern of movement. FIG. 4 shows a preferred pattern for use in the laser welding system. The laser traces a stitch pattern along the face of the Z-notch. The spacing 200 between the stitches is within the range of about 0.020 inches (0.0508 cm) to about 0.028 inches (0.07112 cm). Preferably successive stitches are spaced such that there is no appreciable or minimal non-fused area between the stitches. Furthermore, the movement of the laser in turning corners can be a gradual or curved movement such that an over buildup of fused material is avoided when moving from a stitch in one direction to another direction. Alternatively, as is known in the art, the laser can be "turned off" as it reaches the terminal point of one stitch. The laser can then be repositioned to begin laying down a neighboring stitch at which point it is "turned on". In this manner over buildup at a stitch end point can be avoided. Other laser stitching techniques are known in the art and may be applied to the method of this invention.

The laser that has been found to operate in the present welding method is known as a YAG laser. The YAG laser refers to a Yttrium Aluminum Garnet laser. Such lasers also may include a doping material, such as Neodymium (Nd), and such a laser is sometimes referred to as an Nd:YAG laser. The present invention may also be practiced with YAG lasers that use other dopant materials. In a preferred embodiment, the YAG laser of the present invention is a model 408-1 YAG laser manufactured by US Laser that is commercially available. When operated in continuous wave (CW) mode the laser provides sufficient heat at a specific spot to effect laser welding.

Powder feeder 110 deposits powdered metal through a nozzle discharge 112. In a preferred embodiment, the laser welding system uses an off-axial arrangement for the powdered nozzle; i.e., the axis of discharge for powder nozzle 112 is different from the axis alignment of the laser itself. The preferred rate of powder discharge is in the range of about 0.01 to 0.10 grams per second. The discharge of metal powder is further part of the CNC controller.

The powder discharged in the laser welding system may be powdered metal of the Inconel 713 alloy. The powder used in the laser welding process is compatible with the alloy comprising the workpiece; preferably the powder is the same metal alloy that was used to cast the workpiece although different materials may be used as needed in particular applications. The dimensions of the powder, as measured by its mesh size, are consistent with the powdered alloy typically used in casting operations for turbine blades. A preferred size for powdered Inconel 713 alloy is in the range of 120 to 270 as measured by mesh size of the powder. Praxair is one supplier of this material.

A typical composition of Inconel 713 is 13.5% Cr, 4.5% Mo, 6% Al, 0.9% Ti, 2.1% Cb/Ta, 0.14% C, 0.01% B, 0.08% Zr, and the balance Ni. The following table identifies the constituent concentrations in Inconel 713 by range.

| Element | Wt % Composition |
|---------|------------------|
| Carbon | 0.20 max. |
| Manganese | 1.0 max. |
| Sulphur | 0.015 max. |
| Silicon | 1.0 max. |
| Chromium | 11.00–14.00 |
| Molybdenum | 3.5–4.5 |
| Titanium | 0.25–1.25 |
| Aluminum | 5.5–6.5 |
| Iron | 5.0 max. |
| Cb + Ta | 1.0–3.0 |
| Nickel | Remainder |

INCONEL is a trade name owned by Inco Alloys International, Inc. The name INCONEL refers to a number of nickel and chromium superalloys. Several of the Inconel superalloys are used in aerojet applications, including Inconel 713. The same or similar alloys may also be manufactured by sources which may use a different name. The superalloy used in the laser welding technique of the present invention may also be identified by Unified Numbering System (UNS) Number NO7713.

The welding operation proceeds as the laser and powder feed traverse a face of the workpiece. A preferred linear velocity for the welding process is between about 5 to about 15 inches per minute. The power of the laser during the operation is within the range of about 100 to about 500 watts. One principle of the laser welding repair is to limit the area on the workpiece that receives the heating effect of the laser. Thus, in a preferred embodiment, the area to be repaired is within the range of about 0.001 to about 0.010 square inches (0.0064516 to 0.064516 square cm). Limiting the area to be repaired reduces the likelihood of heat induced microcracks appearing in the workpiece as a result of the welding operation.

Repairs over an area in excess of the 0.001 to 0.010 square inch (0.0064516 to 0.064516 square cm) range may also be achieved. The repair method of such a larger area comprises a series of separate laser welding operations. Each individual welding operation or repair step comprises a laser welding operation for an area of a workpiece within a range of about 0.001 to about 0.010 square inches (0.0064516 to 0.064516 square cm). The repair of such an area will achieve a successful laser fusion with the acceptable fusion of powder to workpiece. After an individual area has been repaired, it is allowed to cool. Upon cooling a second, neighboring area proximate to the first area can then receive a laser fusion operation. In this manner individual laser fusion operations may be performed to achieve a laser fusion on an overall area of desired size.

While the laser welding repair operation may be adapted to other kinds of workpieces, it is designed and intended for particular application to Z-notch wear surfaces on low pressure gas turbine and aero-engine turbine blades. FIG. 2 shows where such wear surfaces typically arise on such blades. Unlike other welding techniques, the welding system of the present invention restores the wear surface of a Z-notch shroud.

Having described the laser fusion assembly from a structural standpoint, a method of using such an assembly in a welding operation will now be described.

It should be appreciated that the described method need not be performed in the order in which it is described, but that this description is merely exemplary of one method.

Figure 5:
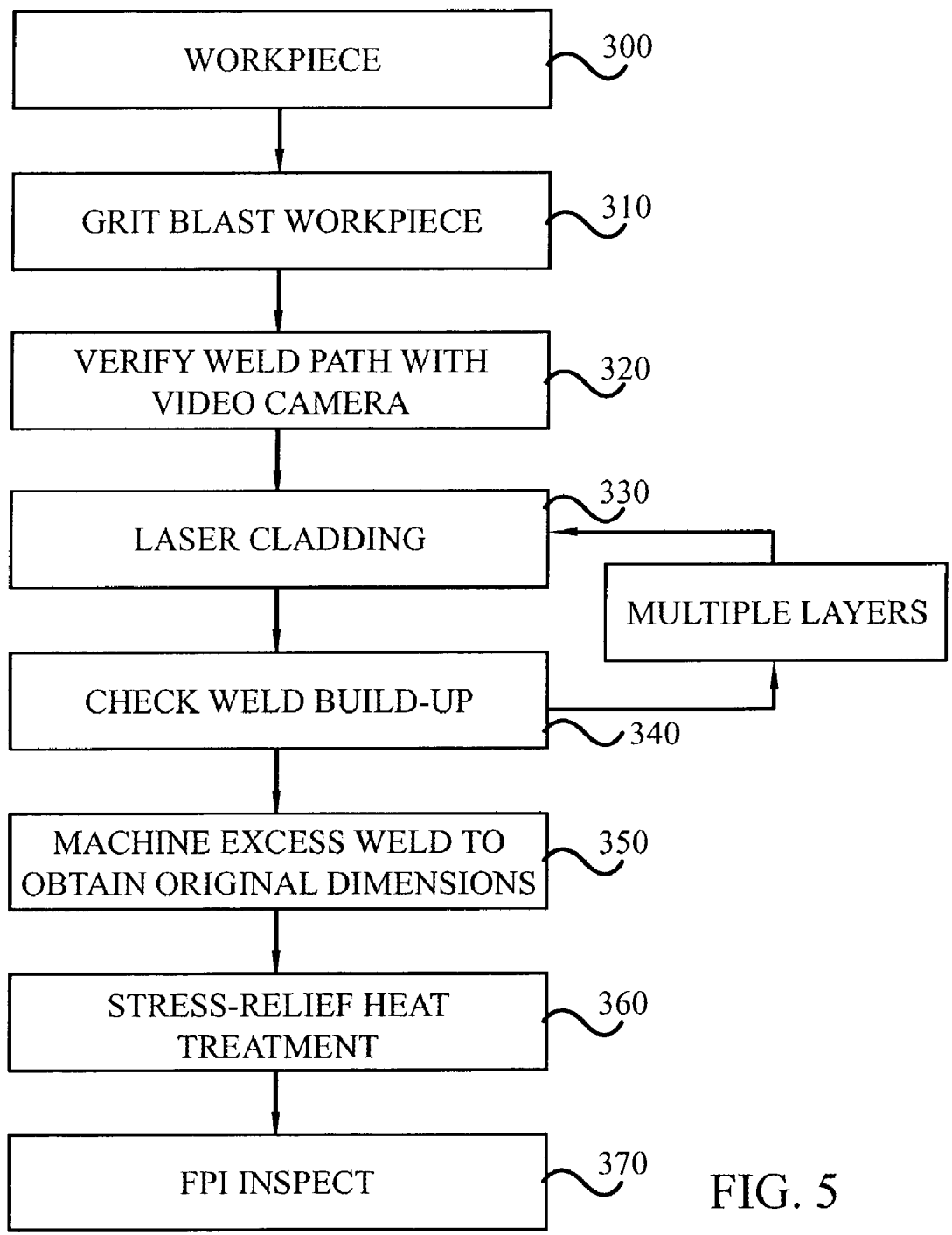
FIG. 5 is an exemplary functional schematic block diagram of a laser welding process using Inconel 713 to repair a turbine blade.

Referring now to FIG. 5 there is shown a functional block diagram of the steps in the laser welding process. A suitable workpiece is first identified in step 300. Inspection of the workpiece confirms that the workpiece is a suitable candidate for repair by laser welding process. The workpiece should not suffer from mechanical defects or other damage that would disqualify it from return to service, other than the wear, which can be repaired by the welding method. Step 310 reflects that the workpiece may be subjected to prewelding operations to prepare the piece for welding. In a preferred embodiment the workpiece receives a grit blasting treatment. Grit blasting step 310 removes materials that interfere with laser welding such as corrosion, impurity buildups, and contamination from the face of the workpiece to be repaired. Next, in step 320 the digital monitoring system of the CNC controller verifies the weld path on the workpiece. Using digital imaging through a video camera, the CNC controller records surface and dimensional data from the workpiece. The operator enters weldpath parameters through the CNC controller. Parameters such as weldpath geometry or "stitching", distances, and linear velocities are entered. Information regarding the welding such as laser power and powder feed rates are also entered.

After these preparatory steps, laser welding commences in step 330. A first deposition pass takes place. Then a series of material deposition steps are repeated, if necessary, through repetitious of steps 330 and 340. In the first pass, the laser welding process deposits a layer of Inconel 713 on the Z-notch wear surface. The thickness of such deposit is between about 20 to about 30 thousandths of an inch (0.00508 to 0.00762 cm). The rate of movement of the workpiece relative to the laser depends on the desired thickness of the deposit, but a range of rates of between about 5 to about 15 inches per minute can be used (12.7 to 38.1 cm/minute). Upon conclusion of a first welding pass, the CNC will check the thickness of the weld deposit, step 340, if the build-up of material is below that desired, a second welding pass occurs. While a single welding pass may be sufficient to deposit the desired thickness of material, it is also the case that multiple passes may be needed to achieve the desired dimension of newly deposited material. In this manner a series of welding passes can build up a desired thickness of newly deposited Inconel 713. When the digital viewer determines that the thickness of material has reached the desired limit, welding ceases.

In step 350 the turbine blade is machined to return the blade to a desired configuration or dimension. The deposition of powdered alloy may result in an uneven surface. Machining restores an even surface of a desired dimension. Similarly, it may be desirable to overdeposit material in order to assure that no voids or low spots remain on the Z-notch wear surface. Known machining techniques can remove excess welding material.

Post welding steps may also include procedures such as a heat treatment to achieve stress relief step 360. Preferably, however, post-welding treatment avoids a step such as hardsurfacing with materials. An FPI (Fluorescent Penetration Inspection) inspection of a turbine blade, step 370, allows the blade to return to service.

A primary advantage of the disclosed repair method is the highly focused application of heat through the YAG laser. The use of a YAG laser allows sufficient heating of the substrate and powdered alloy, both of Inconel 713, in order to form a fusion bond between the substrate and alloy material. The heat, however, is so concentrated that the cracking and damage encountered in other welding techniques is avoided. The degree of fusion and hardness of the weld between the substrate and new material is comparable with that of the underlying matrix material found in the original turbine blade.

A further advantage of the method can be the use of a welding alloy material that is the same material as that used to cast the workpiece. This method avoids the need to hardsurface the finished turbine blade with other materials. A turbine blade that has been restored with the same material as that from which it was cast may go into service with newly cast turbine blades. A mixed material blade cannot be used with newly cast blades. Thus, blades that are restored with this technique provide the added flexibility of being placed into engines with new blades.

Still a further advantage of this method can be the small amount of powdered material consumed by the laser fusion operation. The YAG laser efficiently binds the powdered alloy to the substrate material with little waste of powder. This realizes a cost savings in material.

EXAMPLE

Seven low pressure turbine blades were subjected to the repair method described herein. The blades had been taken out of service for wear in the Z-notch area. One of the seven blades was kept in its received condition for purposes of comparison. A second blade was inspected to determine whether the turbine blades had been subjected to overheating while in service. The gamma prime structure in the blade indicated that the blades had not been subjected to excessive heating, and met service requirements. The remaining five blades were cleaned with an alkaline solution. The Z-notch areas of the blades were inspected by fluorescent penetration inspection to confirm that no cracks were present prior to welding. The Z-notch area of the blades was grit blasted. The blades were then subjected to laser welding with a US LASER 408-1 YAG laser. Three layers of Inconel 713 alloy powder were deposited in three welding passes. The as-welded blades then received a heat treatment. The blades were maintained at 1650 degrees F. (899 degrees C.) for 2 hours in order to eliminate welding stress.

Of the five welded blades, one was kept in its condition after welding. The remaining four were machined to the originally designed blade dimensions. These four blades were then subjected to fluorescent penetration inspection. The welded surface at the Z-notches showed no indications of cracking or irregularity.

Two of the welded blades were then cut up in order to examine the metallurgy of the weldments. Both blades were cut at the Z-notches on both the convex and concave size of each blade. The microstructures of these blades revealed acceptable fusion and penetration of the cladding layers to the underlying base material of the alloy matrix. No defects such as cracks, porosity, or lack of fusion were detected in the welded areas and in the surrounding heat-affected zone.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A method for repairing a worn surface of a turbine blade comprising:
   moving a YAG-generated laser beam over a turbine blade surface in a stitch pattern, wherein the stitch pattern includes a first linear stitch and a second linear stitch, the second linear stitch parallel to, and spaced apart from, the first linear stitch;
   providing an alloy powder to the turbine blade surface; and
   generating sufficient power to the laser to affect a fusion bond between the alloy powder and the turbine blade surface.

2. The method of claim 1 wherein said alloy powder is a nickel-based superalloy.

3. The method of claim 1 wherein said alloy powder comprises, by weight percent, up to about 0.20 carbon, up to about 1.0 manganese, up to about 0.015 sulphur, up to about 1.0 silicon, between about 11.00–14.00 chromium, between about 3.5–4.5 molybdenum between about 0.25–1.25 titanium, between about 5.5–6.5 aluminum, up to about 5.0 iron, between about 1.0–3.0 Cb and Ta, and remainder nickel.

4. The method of claim 1 wherein said alloy powder is the same material as the turbine blade material.

5. The method of claim 1 wherein said alloy powder has mesh size between about 120 and about 270 mesh.

6. The method of claim 1 wherein the area of the wear surface repaired after the fusion step is between about 0.001 and about 0.010 square inches.

7. The method of claim 1 wherein said YAG laser operates with power between the range of about 100 to about 500 watts.

8. The method of claim 6 wherein said YAG laser is operated in continuous wave mode.

9. The method of claim 1 wherein said YAG laser moves with linear velocity relative to the surface of the turbine blade surface of between about 5 and about 15 inches per minute.

10. The method of claim 1 wherein said step of providing an alloy powder further comprises providing the alloy powder through a powder discharge nozzle that has an axial alignment different from the axial alignment of the YAG-generated laser.

11. A method for repairing a worn Z-notch wear surface on a gas turbine engine turbine blade comprised of a substrate of an alloy that comprises, by weight percent, up to about 0.20 carbon, up to about 1.0 manganese, up to about 0.015 sulphur, up to about 1.0 silicon, between about 11.00–14.00 chromium, between about 3.5–4.5 molybdenum, between about 0.25–1.25 titanium, between about 5.5–6.5 aluminum, up to about 5.0 iron, between about 1.0–3.0 Cb and Ta, and remainder nickel, said method comprising:
   digitizing a weld path over the wear surface with a video monitor of a CNC controller;
   generating a laser beam with a Neodymium:yttrium-aluminum-garnet laser;
   discharging an alloy powder comprising by weight percent, up to about 0.20 carbon, up to about 1.0 manganese, up to about 0.015 sulphur, up to about 1.0 silicon, between about 11.00–14.00 chromium, between about 3.5–4.5 molybdenum, between about 0.25–1.25 titanium, between about 5.5–6.5 aluminum, up to about 5.0 iron, between about 1.0–3.0 Cb and Ta, and remainder nickel onto the wear surface through a discharge nozzle with an axial alignment different from the axial alignment of the laser;.
   moving said laser and said alloy discharge nozzle across the wear surface in a stitch pattern to thereby fuse at least one laser clad layer of the alloy powder to the substrate material of the wear surface, wherein the stitch pattern includes a first linear stitch and a second linear stitch, the second linear stitch parallel to, and spaced apart from, the first linear stitch;
   controlling the movement of said laser and said alloy discharge nozzle through a CNC controller using digitized weld path information; and
   measuring the depth of said cladding layer.

12. The method of claim 11 further comprising repeating the steps of generating a laser, discharging the alloy powder, and moving said laser and said alloy discharge nozzle until a cladding layer of desired depth is achieved.

13. The method of claim 11 further comprising machining the wear surface of said turbine blade.

14. The method of claim 11 further comprising grit blasting the wear surface of said turbine blade.

15. The method of claim 11 wherein said cladding layer has a thickness of between about 20 and about 30 thousandths of an inch.

16. The method of claim 11 wherein the distance between said linear stitches is between about 0.020 and about 0.028 inches.

17. The method of claim 11 wherein said laser operates in continuous wave mode.

18. The method of claim 11 wherein the area of the wear surface repaired after a single fusing step is between about 0.001 and about 0.010 square inches.

19. The method of claim 11 wherein the steps of the method are performed in the order presented.

20. A method of repairing a wear surface of a low pressure aerojet turbine blade composed of an alloy comprising, by weight percent, up to about 0.20 carbon, up to about 1.0 manganese, up to about 0.015 sulphur, up to about 1.0 silicon, between about 11.00–14.00 chromium, between about 3.5–4.5 molybdenum, between about 0.25–1.25 titanium, between about 5.5–6.5 aluminum, up to about 5.0 iron, between about 1.0–3.0 Cb and Ta, and remainder nickel, said method comprising the sequential steps of:
   moving a YAG laser and an alloy powder discharge nozzle across a wear surface thereby repairing a first area;
   allowing said first area to cool;
   moving the YAG laser and the alloy powder discharge nozzle across a second wear surface area, proximate said first area, thereby repairing said second area;
   allowing said second area to cool;
   repeating the steps of repairing and cooling for additional areas until a total desired area has been repaired.

21. The method of claim 20 wherein the rate of said powder discharge is between about 0.01 to about 0.10 grams per second.

22. The method of claim 20 wherein the area of the wear surface repaired after a single repairing step is between about 0.001 and about 0.010 square inches.

23. The method of claim 20 further comprising the step of heat treating blades after all repairing steps at a temperature of about 1650 degrees F. for about 2 hours.

24. The method of claim 20 further comprising the step of inspecting said turbine blade with a fluorescent penetrating inspection method.

25. The method of claim 20 further comprising moving the workpiece in the X and Y direction.

26. The method of claim 20 further comprising moving the workpiece in the X, Y, and Z directions.

* * * * *

UNITED STATES PATENT AND TRADEMARK OFFICE
CERTIFICATE OF CORRECTION

| | |
|---|---|
| PATENT NO. | : 7,009,137 B2 |
| APPLICATION NO. | : 10/402111 |
| DATED | : March 7, 2006 |
| INVENTOR(S) | : Guo |

It is certified that error appears in the above-identified patent and that said Letters Patent is hereby corrected as shown below:

In claim 3, column 9, line 19, please insert a comma --,-- between the words "molybdenum" and "between".

Signed and Sealed this

Twenty-seventh Day of March, 2007

JON W. DUDAS
*Director of the United States Patent and Trademark Office*